(No Model.)

G. S. CROSBY.
COLLAR FASTENER.

No. 426,246. Patented Apr. 22, 1890.

Witnesses.
Chas. J. Buchheit.
Emil J. Neuhart.

George S. Crosby, Inventor.
By Wilhelm Bonner,
Attorneys.

THE NORRIS PETERS CO., PHOTO-LITHO., WASHINGTON, D. C.

UNITED STATES PATENT OFFICE.

GEORGE S. CROSBY, OF BUFFALO, NEW YORK, ASSIGNOR TO PRATT & LETCHWORTH, OF SAME PLACE.

COLLAR-FASTENER.

SPECIFICATION forming part of Letters Patent No. 426,246, dated April 22, 1890.

Application filed January 15, 1890. Serial No. 336,975. (No model.)

*To all whom it may concern:*

Be it known that I, GEORGE S. CROSBY, a citizen of the United States, residing at Buffalo, in the county of Erie and State of New York, have invented new and useful Improvements in Horse-Collar Fasteners, of which the following is a specification.

This invention relates to the couplings or fastenings which are employed for connecting together the ends of horse-collars which are divided at their lower portion, so that the collar may be readily applied to and removed from the animal's neck.

The object of my invention is to construct a simple, strong, and durable fastening of this character which may be conveniently locked and unlocked and which is cheaply produced.

Figure 1:
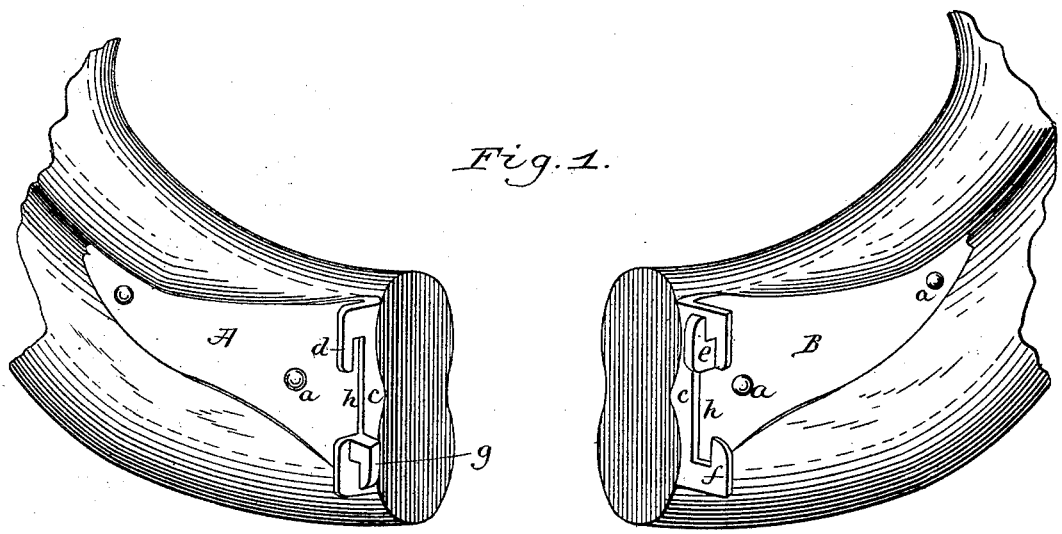
Figure 2:
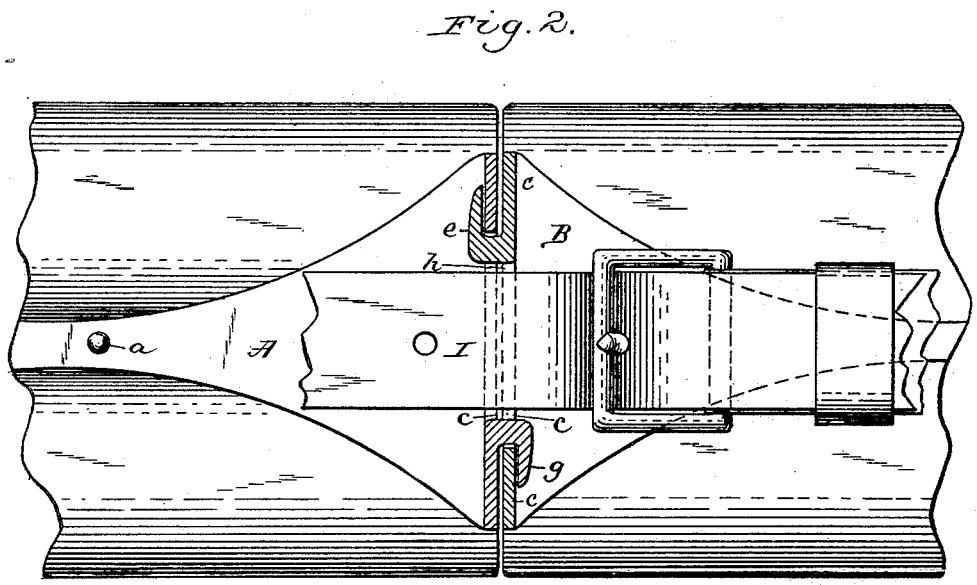

In the accompanying drawings, Figure 1 is a perspective view of the lower portion of a horse-collar provided with my improved fastening, showing the ends of the collar disconnected. Fig. 2 is a face view of the bottom of the collar, showing the fastening partly in section.

Like letters of reference refer to like parts in both figures.

A B represent the two plates or sections of the coupling, which are secured, respectively, to the ends of the collar and carry the interlocking portions of the fastening. These plates are shaped to conform to the outer face of the collar and are secured thereto by rivets or bolts $a$. The plates A B are each formed at their outer ends with a flange or lip $c$. The flange of the plate A is provided at its upper end with a downwardly-projecting hook or tongue $d$, which is arranged in a plane with the flange. The opposite plate B is provided on its inner face near its upper end with an upwardly-projecting hook $e$, arranged at right angles to the flange and adapted to interlock with the tongue $d$ of the plate A.

$f$ represents an upwardly-projecting tongue or hook arranged at the lower end of the flange of the plate B, in a plane with said flange, and $g$ is a downwardly-projecting hook arranged on the inner face of the flange of the plate A, near the lower end thereof and at right angles to said flange, and which is designed to interlock with the tongue $f$ of the plate B.

The flange $c$ of each coupling-plate is provided between its hook and tongue with a recess $h$.

In connecting the ends of the collar the ends are brought together and moved laterally out of line, so as to allow the inwardly-projecting hooks $e\,g$ of the respective coupling-plates to pass through the recesses $h$ and permit the meeting ends of the collar to abut against each other. The ends of the collar are then moved back to their normal position in line with each other, which causes the noses of the projecting hooks $e\,g$ to engage behind the adjacent portions of the flanges $c$, as represented in Fig. 2, and the tongues $d\,f$ to overlap the shanks of the hooks, thereby interlocking the two sets of hooks and tongues with each other and securely coupling the ends of the collar together. The hook and tongue of each set being arranged at right angles to each other, the hooks hold the ends of the collar against movement away from each other, while the tongues prevent the same from moving inwardly or outwardly upon each other.

The flat-sided shanks of the projecting hooks $e\,g$ are made of such width as to fit snugly into the narrow spaces between the tongues $d\,f$ and the adjacent edges of the flanges $c$, so as to form a tight and firm joint.

The parts of the coupling are readily disconnected by moving the ends of the collar laterally upon each other in a reverse direction to that by which they are locked together.

I represents the hame-strap, which connects the lower ends of the hames. This strap is seated in the recesses $h$ of the flanges $c$ when the parts are interlocked and prevents the projecting hooks $e\,g$ from moving toward each other, thereby retaining the parts of the fastening in engagement and preventing the same from becoming accidentally unlocked.

I claim as my invention—

1. A fastening for connecting the ends of a horse-collar, consisting of two coupling-plates secured, respectively, to the ends of the collar and each having a flange provided at one end with a tongue arranged in a plane with the flange and at its opposite end with a hook projecting at right angles to the flange, the tongues and hooks on the plates reversely arranged, and the hook of one coupling-plate interlocking with the tongue of the other plate, substantially as set forth.

2. A fastening for connecting the ends of a horse-collar, consisting of two coupling-plates secured, respectively, to the ends of the collar and each having a flange provided at one end with a tongue arranged in a plane with the flange at its opposite end, with a hook projecting at right angles to the flange and between said hook and tongue, with a recess for the reception of the hame-strap, the tongue and hook on one plate being reversely arranged with the tongue and hook on the other plate, substantially as set forth.

Witness my hand this 2d day of January, 1890.

GEORGE S. CROSBY.

Witnesses:
EDWARD W. KERR,
W. C. HOUCK.